(12) United States Patent
Kim

(10) Patent No.: US 7,756,286 B2
(45) Date of Patent: Jul. 13, 2010

(54) MOBILE TERMINAL HAVING SPEAKER

(75) Inventor: Kye-Won Kim, Hanam (KR)

(73) Assignee: LG Electronics Inc., Seoul (KR)

( * ) Notice: Subject to any disclaimer, the term of this patent is extended or adjusted under 35 U.S.C. 154(b) by 1253 days.

(21) Appl. No.: 11/295,891

(22) Filed: Dec. 6, 2005

(65) Prior Publication Data
US 2006/0128441 A1 Jun. 15, 2006

(30) Foreign Application Priority Data
Dec. 9, 2004 (KR) ................. 10-2004-0103622

(51) Int. Cl.
*H04R 1/02* (2006.01)
(52) U.S. Cl. .................... 381/388; 381/395
(58) Field of Classification Search .......... 381/306, 381/386, 388, 395; 379/430, 431, 432; 455/569.1, 455/575.2
See application file for complete search history.

(56) References Cited

U.S. PATENT DOCUMENTS
6,243,260 B1 * 6/2001 Lundgren et al. ........... 381/386

FOREIGN PATENT DOCUMENTS
CN 1300497 6/2001
KR 20-0368097 11/2004

* cited by examiner

*Primary Examiner*—Brian Ensey
(74) *Attorney, Agent, or Firm*—Lee, Hong, Degerman, Kang & Waimey

(57) ABSTRACT

A mobile terminal comprising a body, at least one pair of speakers movably provided at the body, and an operating mechanism provided at the body and operatively coupled with the speakers to move the speakers into and out of the body such that a distance between the pair of speakers is increased when the operating mechanism moves each speaker out of the body in opposite directions, whereby more stereophonic sound can be outputted through the speakers.

18 Claims, 6 Drawing Sheets

MOBILE TERMINAL HAVING SPEAKER

CROSS REFERENCE TO RELATED APPLICATION

Pursuant to 35 U.S.C. §119(a), this application claims the benefit of earlier filing date and right of priority to Korean Application No. 10-2004-0103622, filed Dec. 9, 2004, the contents of which are hereby incorporated by reference herein in their entirety.

BACKGROUND OF THE INVENTION

1. Field of the Invention

The present invention relates to a mobile (communications) terminal, and particularly, to a mobile terminal having speakers for generating stereophonic sound.

2. Background of the Related Art

Mobile terminals including mobile telephones or Personal Digital Assistants (PDAs) are being developed so as to have functions as players for music files such as MP3 players, televisions capable of viewing various programs through an Internet or public broadcastings, players of video files (e.g., Video on Demand (VOD)), or the like in addition to typical functions.

In this regard, it is more usual to install a plurality of speakers in a mobile terminal such that users can hear more stereophonic sound and simultaneously hear sound with large sound volume.

An exemplary mobile terminal having a related art stereo speaker will now be explained with reference to FIG. 1.

As illustrated in FIG. 1, a mobile terminal 10 may include a lower folder 20 having a plurality of input keys 21 at its top surface, and an upper folder 30 which is coupled to the lower folder 20 to be folded or unfolded and has a display window 31 on its inner surface.

Two speakers 41 and 42 are fixedly installed at both right and left sides of an upper portion of the display window 31 within the upper folder 30.

However, both two speakers 41 and 42 are fixed to an inner space of the upper folder 30, and accordingly it is difficult to sufficiently implement stereophonic sound. In addition, mobile terminals which are slimmer and lighter are required. As a result, a width between speakers is getting narrower which causes difficulty in hearing stereophonic sound.

BRIEF DESCRIPTION OF THE INVENTION

Therefore, an object of the present invention is to provide a technical device by which a distance between stereo speakers installed in a mobile terminal is extended to thus allow hearing of stereophonic sound, and also to provide a mobile terminal capable of allowing users to conveniently hear stereophonic sound by simultaneously extending the distance between the speakers by performing a simple operation.

To achieve these and other advantages and in accordance with the purpose of the present invention, as embodied and broadly described herein, there is provided a mobile terminal comprising: a body; at least one pair of speakers movably provided at the body; and an operating mechanism provided at the body and operatively coupled to the speakers to move the speakers into and out of the body such that a distance between the speakers is increased when the operating mechanism moves each speaker out of the body in opposite directions.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
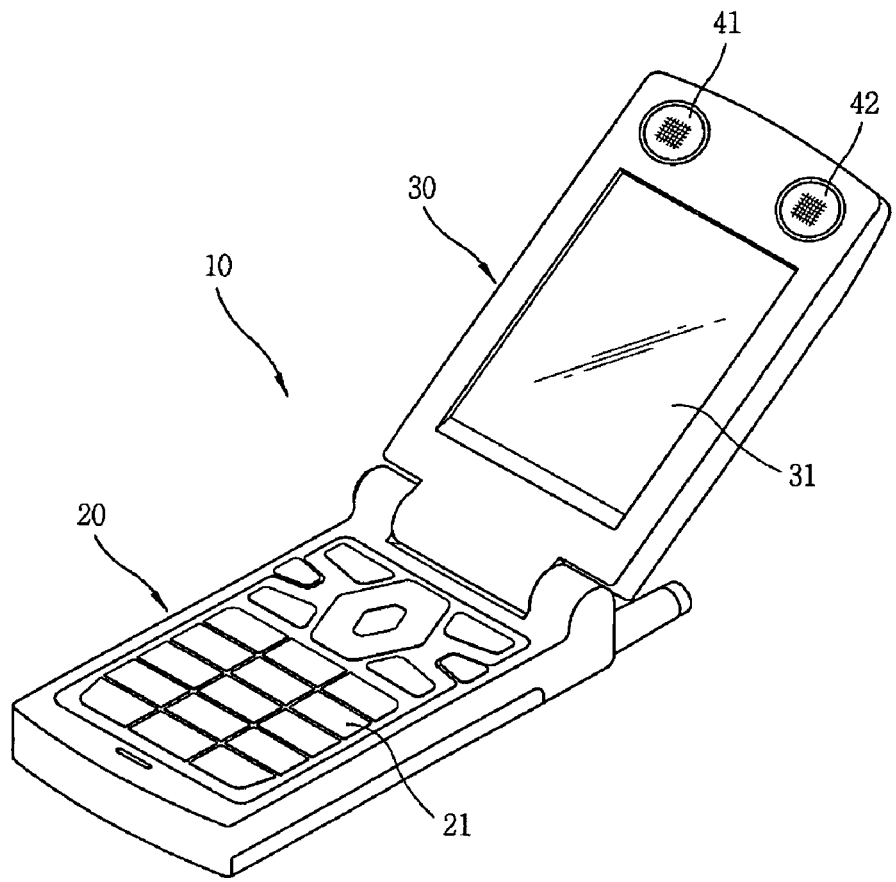
FIG. 1 is a perspective view illustrating a related art mobile terminal having speakers.

Reference will now be made in detail to the preferred embodiments of the present invention, examples of which are illustrated in the accompanying drawings.

Hereinafter, a mobile terminal in accordance with an embodiment of the present invention will now be explained with reference to the attached drawings.

There may exist plural embodiments for the mobile terminal according to the present invention, and the preferred embodiments therefor will be explained.

FIGS. 2 to 10 illustrate a mobile terminal 100 in accordance with an embodiment of the present invention. Reference numerals are not provided for every component or element which are paired with each other, and thus it must be considered that a corresponding component or element may not have a reference numeral but only another component or element corresponding thereto (i.e., component or element which makes a pair with the corresponding component or element) may have the reference numeral.

A mobile terminal 100 according to the present invention may comprise: a body; at least one pair of speakers movably provided at the body; and an operating mechanism provided at the body and operatively coupled to the speakers to move the speakers into and out of the body such that a distance between the pair of speakers is increased when the operating mechanism moves each speaker out of the body in opposite directions.

Figure 2:
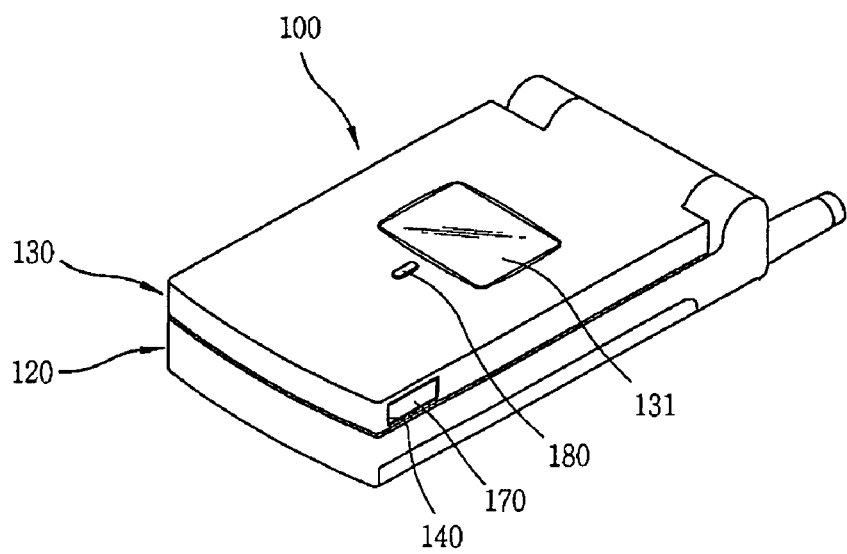
FIG. 2 is a perspective view illustrating a mobile terminal when it is folded in accordance with an embodiment of the present invention.
Figure 3:
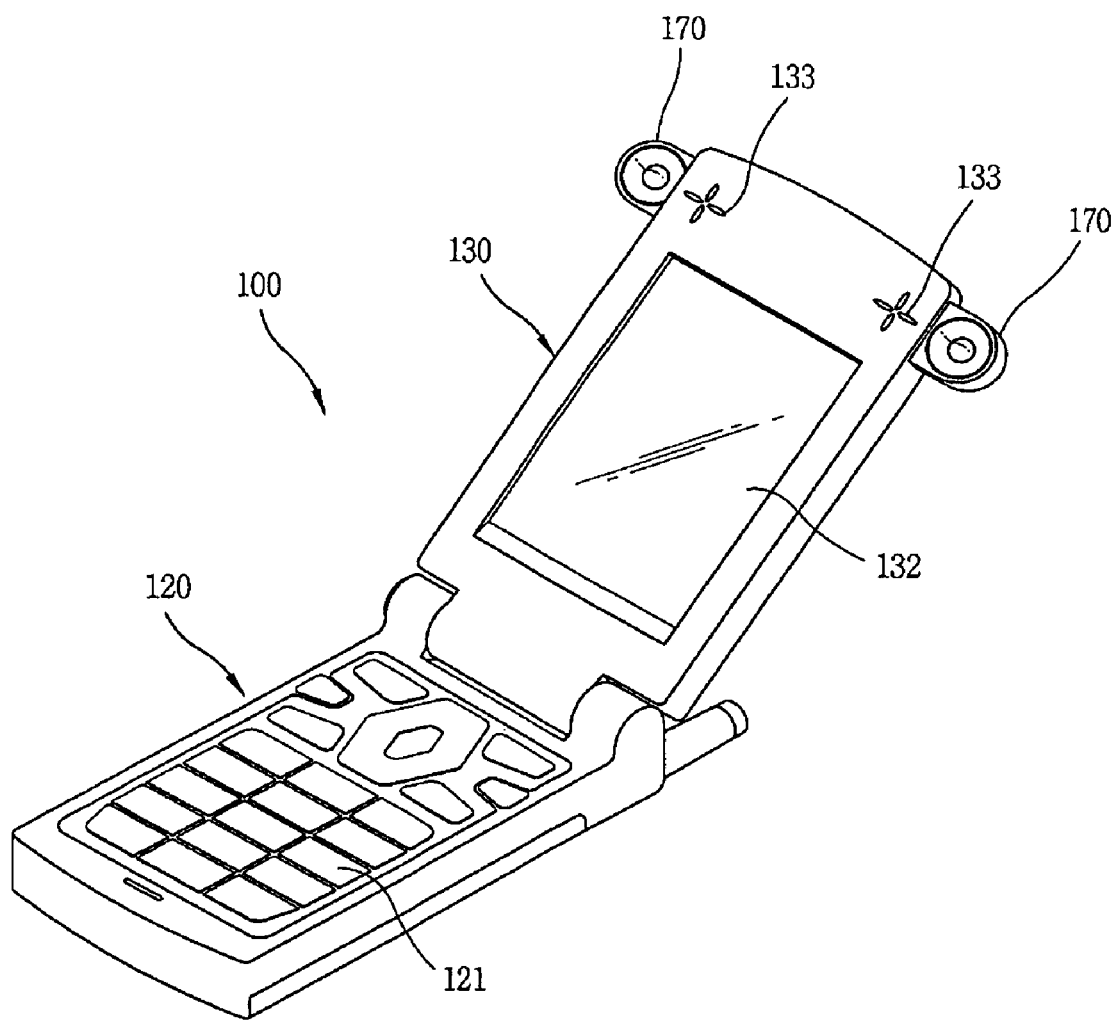
FIG. 3 is a perspective view illustrating the mobile terminal shown in FIG. 2 when it is unfolded.

FIGS. 2 and 3 illustrate a folder type mobile terminal 100 in accordance with an embodiment of the present invention for which explanation will now be made in more detail.

As illustrated in the drawings, a mobile terminal 100 according to an embodiment of the present invention may include a lower folder 120 having a plurality of input keys 121 provided at an upper surface thereof, and an upper folder 130 hinge-coupled to the lower folder 120 and having an internal display window 132 at its inner surface and an external display window 131 at its outer surface.

In particular, a pair of speaker assemblies (i.e., see 170 in FIG. 4) in each of which a speaker 163 is installed are provided at both sides of an upper end of the upper folder 130. When pressing a shooting button 180 provided at an outer surface of the upper folder 130, the pair of the speaker assemblies 170 are spaced from each other to thus protrude out of a pair of guide holes 140. Here, sound openings 133 are provided at the upper end of the upper folder 130 so as to transfer sound generated from the speakers 163 to the exterior when each speaker assembly 170 is positioned within the upper folder 130.

Figure 4:
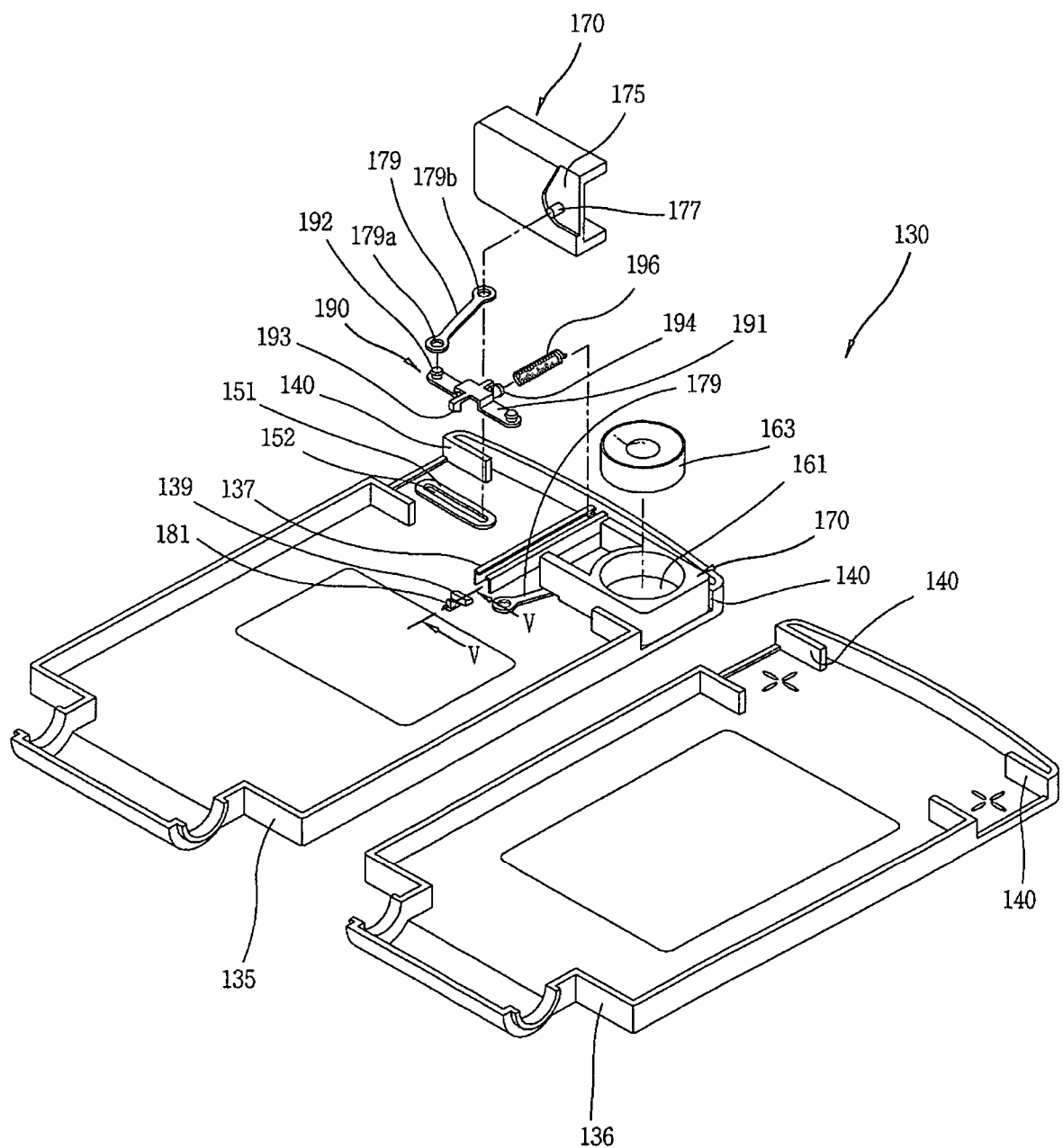
FIG. 4 is an exploded perspective view illustrating an inner structure of a folder unit provided with speakers of the mobile terminal shown in FIG. 2.

FIG. 4 is an exploded perspective view illustrating a structure including main parts of the upper folder, particularly, an operating mechanism for moving the speakers 163 into and out of the body by exploding the upper folder into an upper case 135 and a lower case 136.

Referring to FIG. 4, a pair of guide holes 140 are provided at right and left side surfaces of each of the upper and lower cases 135 and 136 of the upper folder 130 so as to be opened out of the upper and lower cases 135 and 136, thereby guiding each speaker assembly 170 inwardly or outwardly to the upper folder 130. Here, each speaker 163 is accommodated in a speaker accommodating hole 161 formed in one surface of each speaker assembly 170.

Especially, a pair of guide rails 151 having a rail groove 152, respectively, are formed inside the guide holes 140 of the upper case 135 to thus enable guiding of a moving path and a stop point of each speaker assembly 170. A slide protrusion 177 is provided at another surface of each speaker assembly 170 to allow each speaker assembly 170 to move in a state of being restricted in the rail groove 152.

Each speaker assembly 170 in which each speaker 163 is accommodated is provided within the upper folder 130 to move into and out of the upper folder by a guide unit coupled to the (corresponding) speaker 163 and an operating unit for operating the guide unit.

The guide unit may include a pair of link members 179 of which one end is rotatably coupled to each speaker assembly 170, and a guide member 190 rotatably coupled to the other end of each link member 179, and installed within the upper folder to move in a direction perpendicular to the moving direction of each speaker assembly 170.

The link member 179 has hinge openings 179a and 179b at both ends thereof in order to be rotatably coupled to the speaker assembly 170 and the guide member 190. The slide protrusion 177 is formed at one surface of the speaker assembly 170 to be coupled to the hinge opening 179b. A groove 175 is formed around the slide protrusion 177 to allow rotating of the link member 179.

In addition, a length of each link member 179 may preferably be uniform so as to allow the guide member 190 to move in the direction perpendicular to the moving direction of the speaker assembly 170.

The guide member 190 has a cross shape. A rotating pin 192 coupled to the hinge opening 179a of the link member 179 is formed at an end of each wind portion 191 formed in a direction perpendicular to the moving direction of the guide member 190. A hook 193 and an elastic member fixing portion 194 related to a shooting unit to be explained later are formed at both ends of the guide member 190 which extends outwardly in the direction perpendicular to the wing portion 191.

Figure 5:
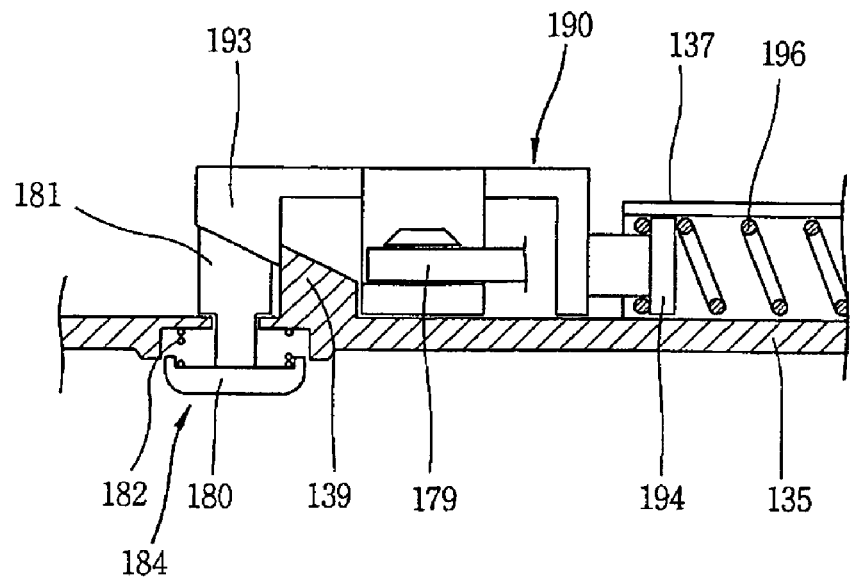
FIGS. 5 and 6 are cross-sectional views illustrating exemplary operations of a speaker operating mechanism of a mobile terminal in accordance with an embodiment of the present invention.
Figure 6:
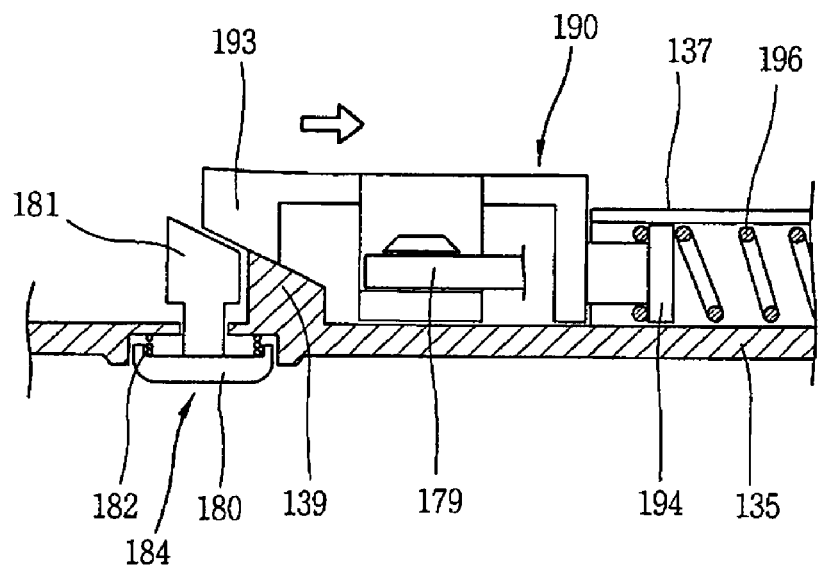

Referring to FIGS. 4 to 6, on the other hand, explanations will now be made for the operating unit for operating the guide unit and thus moving the speaker assemblies 170 out of the upper folder 130 so that the distance between the speaker assemblies 170 is increased.

The operating unit includes an elastic member and a shooting unit.

One end of the elastic member is coupled into the upper folder 130 and the other end thereof is coupled to the guide member 190. The elastic member applies an elastic force to the guide member 190 in a direction perpendicular to the direction in which the speaker assemblies 170 move out of the upper folder 130. Here, a coil spring 196 is preferably used as the elastic member but other material which has the elastic force can be used as the elastic member.

The elastic member, on the other hand, is fixedly coupled to the elastic member fixing portion 194 of the guide member 190, and arranged in parallel with the moving direction of the guide unit 190. The elastic member is also preferably installed to be forcibly extended when each speaker assembly 170 is positioned within the upper folder 130. A spring guide 137 having the elastic member therein is formed inside the upper folder 130 along the moving direction of the guide member 190.

The shooting unit is provided within the upper folder 130 to lock the guide member 190 while each speaker assembly 170 is positioned within the upper folder 130 and also to release the locked state of the guide member 190 in order to allow the speaker assembly 170 to move out of the upper folder 130.

The shooting unit may include: a hook 193 formed at one end of the guide member 190, a stopper 139 formed inside the upper folder 130 to lock the hook 193, and a shooting button 184 of which one end is exposed to the outside of the upper folder 130 at a rear side of the stopper 139 to separate the hook 193 from the stopper 139 by pushing the hook 193 to thus shoot the guide member 190.

Here, one surface of the hook 193 and one surface of the stopper 139 in contact with the one surface of the hook 193 are formed to be inclined to each other by a particular angle in order to allow the hook 193 to move more easily when the hook 193 is released from the stopper 139 by pressing the shooting button 184.

The shooting button 184 may include a pushing bar 181 directly pushing the hook 193 locked at the stopper 139, and a button portion 180 integrally formed at the pushing bar 181 and exposed to the outside of the upper folder 130. A return spring 182 is mounted in an inner surface of the button portion 180 in order to return the shooting button 184 to its original location.

Hereinafter, referring to FIGS. 5 to 8, an operation that the speakers move into and out of the upper folder in the mobile terminal 100 according to the embodiment of the present invention having such construction will now be explained.

First, upon pressing the shooting button 184 in a state that the hook 193 is stopped by being locked at the stopper 139 as illustrated in FIG. 5, the hook 193 is separated from the stopper 139 as illustrated in FIG. 6. The guide member 190 moves along the spring guide 137 by an elastic force of the coil spring 196, and simultaneously each link member 179 coupled with the guide member 190 rotates and moves.

Figure 7:
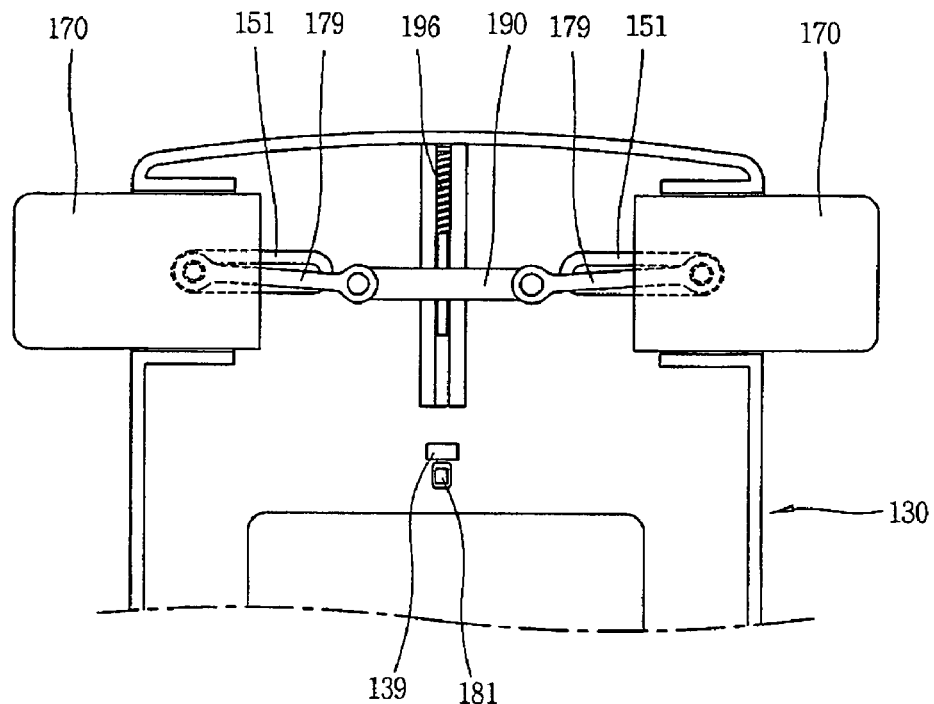
FIGS. 7 and 8 are operational views illustrating speakers when they are operated according to the embodiment of the speaker operating mechanism shown in FIGS. 4 to 6.

Accordingly, as illustrated in FIG. 7, when the return of the coil spring 196 allows the guide member 190 to move to the upper portion of the upper folder 130, an angle between each link member 179 coupled with the guide member 190 coupled thereto is increased such that each speaker assembly 170 moves out of the upper folder 130. As a result, a distance between the speaker assemblies 170 is increased so as to enable outputting of greater stereophonic sound through the speakers 170.

Figure 8:
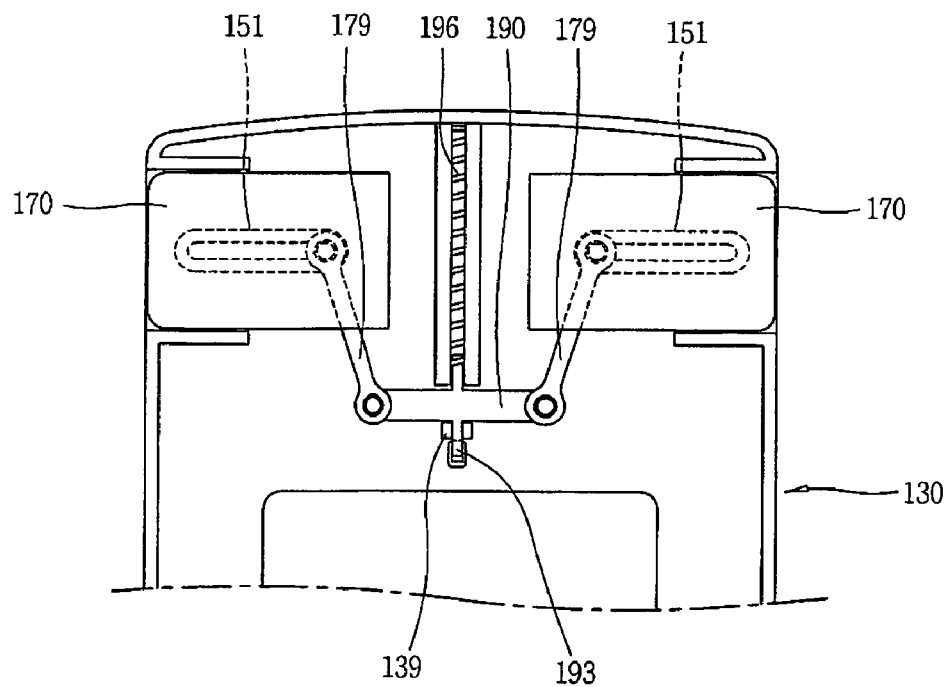

When each speaker assembly 170 completely extends to the outside of the upper folder 130 and is then stopped, on the other side, an angle between each link member 179 must be smaller than 180°, and accordingly a user can directly push each speaker assembly 170 into the upper folder 130 using his hand, as illustrated in FIG. 8, so as to return it to its original location and also to fix the hook 193 to the stopper 139.

That is, while each speaker assembly 170 is located within the upper folder 130, the user can hear stereophonic sound through the sound openings 133 formed at the upper portion of the internal display window 132. While the speaker assemblies 170 protrude to the outside of the upper folder 130, on the other side, the user can hear more stereophonic sound by the increased distance between the speakers 163.

A mobile terminal 100 provided with speakers according to another embodiment of the present invention will now be explained, in particular, in relation to another example of the driving unit.

Here, the same structure and explanation therefor as the embodiment of the present invention will be omitted, and the same reference numerals will be provided for the same structure.

Figure 9:
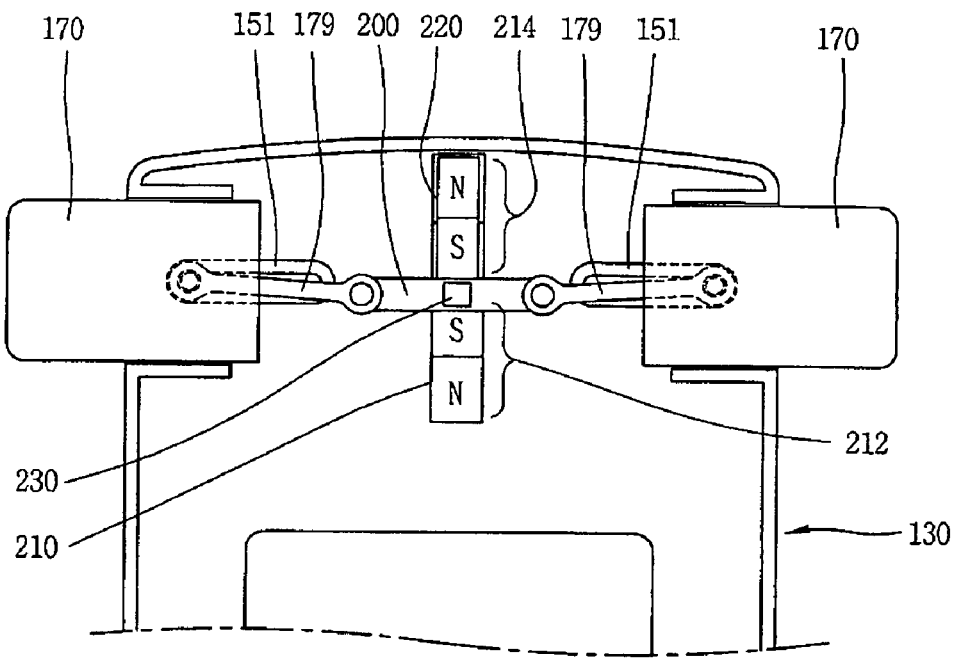
FIGS. 9 and 10 are exemplary operational views illustrating another embodiment of a speaker operating mechanism of a mobile terminal according to an embodiment of the present invention and speakers when they are operated according to the speaker operating mechanism.
Figure 10:
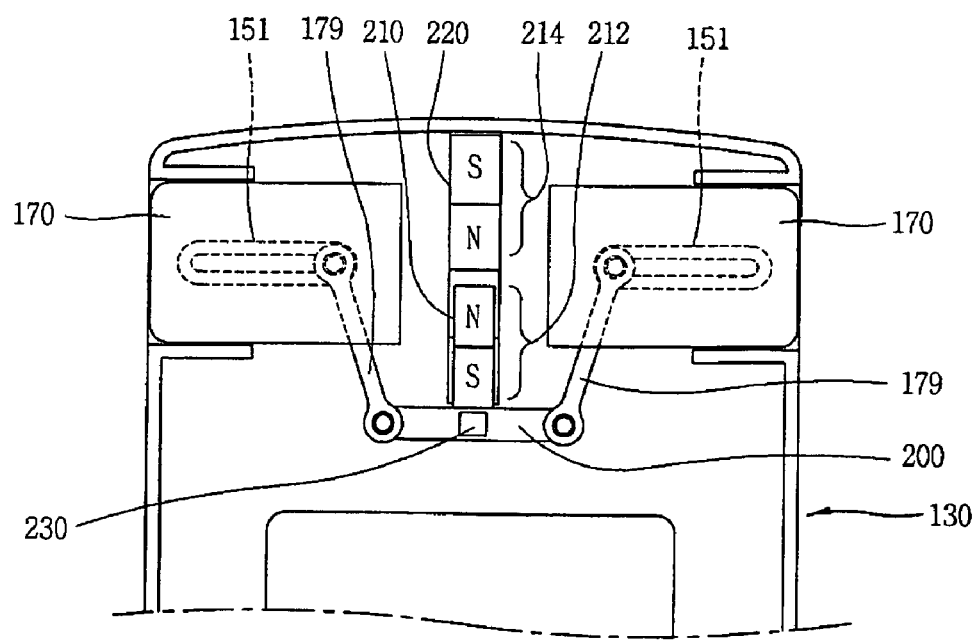

FIGS. 9 and 10 are operational views illustrating another embodiment of a speaker operating mechanism of a mobile terminal 100 according to an embodiment of the present invention and a state in which speakers operate according to the speaker operating mechanism.

As illustrated in FIGS. 9 and 10, the guide unit in the mobile terminal 100 is operated by a magnetic force.

That is, a first permanent magnet 210 is fixedly installed in the upper folder 130 along the moving path (direction) of the guide member 200. A second permanent magnet 220 is fixedly installed at the guide member 200 to move the guide member 200 such that the second permanent magnet 220 reacts to a plurality of magnetic fields formed by the first permanent magnet 210 to thus allow moving of the speaker assemblies 170 into and out of the upper folder 130.

Here, the first permanent magnet 210 is formed to extend along the moving direction of the guide member 200, while the second permanent magnet 220 is preferably arranged to be in parallel with the first permanent magnet 210.

The first permanent magnet 210 is formed such that two North (N)-poles and two South (S)-poles are alternatively arranged. That is, two areas 212 and 214 including the N-pole and the S-pole, respectively, exist at the first permanent magnet 210 along the moving direction of the guide member 200. The second permanent magnet 220, on the other hand, is formed with one N-pole and one S-pole. Accordingly, when the speaker assemblies 170 are located at the inside or at the outside of the upper folder 130, the first permanent magnet 210 and the second permanent magnet 220 face each other at opposite poles thereof. In other words, when the speaker assemblies 170 are located within the upper folder 130, the second permanent magnet 210 is located at the first area 212 of the first permanent magnet 210. When the speaker assemblies 170 are located at the outside of the upper folder 130, the second permanent magnet 220 is located at the second area 214 of the first permanent magnet 210.

The second permanent magnet 220, on the other side, is mounted at one surface of the guide member 200 to be arranged at an upper portion of the first permanent magnet 210. The second permanent magnet 220 may also be mounted at one surface of the guide member 200 to be arranged at a side portion of the first permanent magnet 210.

Furthermore, the first and second permanent magnet 210 and 220 may be arranged to be adhered to each other. However, the second permanent magnet 220 may preferably be arranged to be spaced from the first permanent magnet 210 by a particular interval therebetween in order to prevent a generation of physical friction when the first permanent magnet 220 moves above the first permanent magnet 210.

A handle grip 230 exposed out of the upper folder 130 is integrally formed at one surface of the guide member 200 so as to apply a force to the guide member 200 in the moving direction of the guide member 200.

An operation that where the speakers move into and out of the upper folder 130 in the mobile terminal 100 in accordance with an embodiment of the present invention having such construction will now be explained.

First, while the speaker assemblies 170 are located within the upper folder 130, an attraction between the first area 212 of the first permanent magnet 210 and the second permanent magnet 220 is generated. Accordingly, the speaker assemblies 170 can maintain the state of being positioned within the upper folder 130. At this time, when the user slightly pushes the handle grip 230 toward the direction that the speaker assemblies 170 move out of the upper folder 130, the second permanent magnet 220 resists the attraction with the first area 212 of the first permanent magnet 210 to move to the second area 214 of the first permanent magnet 210. At this time, the second permanent magnet 220 is getting close to the second area 214 of the first permanent magnet 210, and thus the attraction is generated between the second permanent magnet 220 and the second area 214 of the first permanent magnet 210. Accordingly, when the user pushes the handle grip 230 to move the second permanent magnet 220 by a particular distance, the second permanent magnet 220 semi-automatically moves to the second area 214 of the first permanent magnet 210 to thus maintain its stopped state thereat. As a result, the guide member 200 integrally formed with the second permanent magnet 220 moves, and each link member coupled to the guide member 200 rotates and moves at the same time.

Accordingly, as the angle between each link member 179 coupled to the guide member 200 is increased, each link member 179 moves each speaker assembly 170 to the outside of the upper folder 130. As a result, the distance between the speaker assemblies 170 is increased, and thus more stereophonic sound can be outputted through the speakers 163.

Upon desiring to return the speaker assemblies 170 completely extending out of the upper folder 130 into the upper folder 130, the user can directly push each speaker assembly 170 into the upper folder 130 using his hand. At this time, the second permanent magnet 220 which is generating the attraction with the second area 214 of the first permanent magnet 210 moves to the first area 212 of the first permanent magnet 210. When the second permanent magnet 220 has moved by a particular distance, the attraction is generated between the second permanent magnet 220 and the first area 212 of the first permanent magnet 210 so that the second permanent magnet 220 can semi-automatically move to the second area 214 of the first permanent magnet 210 and thus maintain its stopped state thereof. As a result, the guide member 200 integrally formed with the second permanent magnet 220 moves, and each link member 179 coupled to the guide member 200 rotates and moves at the same time. Accordingly, the speaker assemblies 170 can return into the upper folder 130.

As described so far, when the user desires to hear sound such as music through the speakers, the speakers provided in the body of the mobile terminal according to the present invention are allowed to move out of the body in a direction that the distance between the speakers is increased, and thus the user can hear more stereophonic sound such as music having high quality.

In addition, the speakers can be free to move into and out of the body of the mobile terminal, and thus the speakers can conveniently move to a position where the user desires according to types of sound to desirably listen.

Also, the speakers can move into and out of the body of the mobile terminal simply by one-time operation, which leads to an improvement of efficiency in using it.

Thus, the explanation has been made for the mobile terminal having the speakers according to the present invention which has applied to the folder type mobile terminal, however, it may not be limited thereon. The present invention can also be applied to various mobile terminals such as one-body type integral mobile terminals, slide type mobile terminals, and the like. Also, instead of the construction in which the speakers are accommodated in the speaker assemblies, a construction in which the guide unit is coupled to the speakers itself may be applicable.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
   a body;
   at least one pair of speakers movably provided at the body; and
   an operating mechanism provided at the body and operatively coupled with the speakers to move the speakers into and out of the body such that a distance between the speakers is increased when the operating mechanism moves each speaker out of the body in opposite directions,
   wherein the operating mechanism includes a guide unit provided within the body that is coupled to the speakers and an operating unit for operating the guide unit to allow the speakers to move into and out of the body, and
   wherein the guide unit includes a pair of link members, one end of which is rotatably coupled to the pair of speakers, and a guide member rotatably coupled to the other end of each link member and installed in the body to move in a direction perpendicular to a moving direction of the speakers.

2. The terminal of claim 1, wherein the operating unit includes:
   an elastic member of which one end is coupled into the body and the other end is coupled to the guide member, for applying an elastic force to the direction perpendicular to the direction that the speakers move out of the body; and
   a shooting unit provided in the body, for locking the guide member when the speakers are located within the body and releasing the locked state of the guide member to thus allow the speakers to move out of the body.

3. The terminal of claim 2, wherein a spring guide having the elastic member therein is formed in the body along the moving direction of the guide member.

4. The terminal of claim 3, wherein the elastic member is a coil spring arranged in parallel with the moving direction of the guide unit.

5. The terminal of claim 4, wherein the coil spring is installed to be forcibly extended when the speakers are located within the body.

6. The terminal of claim 2, wherein the shooting unit includes:
   a hook formed at one end of the guide member;
   a stopper formed in the body, for locking the hook; and
   a shooting button of which one end is exposed out of the body at a rear side of the stopper, and for pushing the hook to be separated from the stopper, thereby shooting the guide member.

7. The terminal of claim 1, wherein the link members are installed such that an angle between each link member is smaller than 180° when each speaker completely moves out of the body.

8. The terminal of claim 1, wherein a pair of guide rails are formed in the body to guide moving path and stop point of each speaker when each speaker moves into and out of the body.

9. The terminal of claim 8, wherein the guide rail has a rail groove formed along the moving direction of the speaker, and a slide protrusion is formed at one surface of the speaker to move in a state of being inserted in the rail groove.

10. The terminal of claim 9, wherein the link member is coupled to the slide protrusion of the speaker.

11. The terminal of claim 1, wherein the operating unit includes:
    a first permanent magnet fixed in the body along the moving path of the guide member; and
    a second permanent magnet fixedly installed at the guide member, for moving the guide member by reacting to a plurality of magnetic fields formed by the first permanent magnet to thus allow the speakers to move into and out of the body.

12. The terminal of claim 11, wherein the first permanent magnet is formed to extend along the moving direction of the guide member, and the second permanent magnet is arranged to be in parallel with the first permanent magnet.

13. The terminal of claim 11, wherein the first permanent magnet is formed such that two North (N)-poles and two South (S)-poles are alternatively arranged.

14. The terminal of claim 13, wherein the second permanent magnet is formed with one N-pole and one S-pole, and when the speakers are located at the inside or at the outside of the body, the first permanent magnet and the second permanent magnet face each other at opposite poles thereof.

15. The terminal of claim 11, wherein the second permanent magnet is mounted at one surface of the guide member to be arranged at an upper portion of the first permanent magnet.

16. The terminal of claim 11, wherein the second permanent magnet is mounted at one surface of the guide member to be arranged at a side portion of the first permanent magnet.

17. The terminal of claim 11, wherein the first permanent magnet is spaced from the second permanent magnet by a particular interval therebetween.

18. The terminal of claim 11, wherein a handle grip exposed to the outside of the body is provided at one surface of the guide member such that a user can apply a force to the guide member in the moving direction of the guide member.

* * * * *